(12) United States Patent
Bullock

(10) Patent No.: US 7,708,508 B2
(45) Date of Patent: May 4, 2010

(54) ADJUSTABLE LOAD STABILIZER METHOD AND APPARATUS

(76) Inventor: Matthew Bullock, 6314 Georgetown Pike, McLean, VA (US) 22101

(*) Notice: Subject to any disclaimer, the term of this patent is extended or adjusted under 35 U.S.C. 154(b) by 641 days.

(21) Appl. No.: 11/459,356

(22) Filed: Jul. 23, 2006

(65) Prior Publication Data

US 2008/0019790 A1 Jan. 24, 2008

(51) Int. Cl.
*B60P 7/08* (2006.01)
(52) U.S. Cl. .................. 410/123; 410/128; 410/151; 410/155
(58) Field of Classification Search ......... 410/122–124, 410/127, 128, 151, 154, 155; 248/354.3, 248/354.4, 354.6; 211/105.4; 114/75
See application file for complete search history.

(56) References Cited

U.S. PATENT DOCUMENTS

| | | | |
|---|---|---|---|
| 2,199,851 A * | 5/1940 | Culver | |
| 2,263,698 A * | 11/1941 | Hodgson | |
| 3,612,463 A | 10/1971 | Grant | |
| 4,553,888 A | 11/1985 | Crissy et al. | |
| 5,037,256 A | 8/1991 | Schroeder | |
| 5,062,751 A | 11/1991 | Liebel | |
| 5,132,156 A | 7/1992 | Trassare, Jr. et al. | |
| 5,139,842 A | 8/1992 | Sewell | |
| 5,484,643 A | 1/1996 | Wise et al. | |
| 5,846,038 A | 12/1998 | Bostelman | |
| 5,855,459 A | 1/1999 | Krier et al. | |
| 5,947,666 A | 9/1999 | Huang | |
| 6,419,434 B1 | 7/2002 | Rahn | |
| 6,435,787 B1 | 8/2002 | John | |
| 6,527,488 B2 | 3/2003 | Elze et al. | |
| 6,533,513 B2 | 3/2003 | Kanczuzewski et al. | |
| 6,568,636 B2 | 5/2003 | Fitzgerald | |
| 7,048,485 B2 * | 5/2006 | Dean et al. ................. | 410/129 |

* cited by examiner

*Primary Examiner*—Stephen Gordon
(74) *Attorney, Agent, or Firm*—Bradford Kile, Esq.; Kile Goekjian Reed & McManus

(57) ABSTRACT

A method and apparatus for stabilizing cargo within a transport container. First and second tubular elements are provided having generally cylindrical bodies and bearing members at a terminal end which can react against opposing surfaces within the transport container and stabilize cargo within the container. An extension mechanism allows for the extension and selective translation between the first and second tubular members allowing the apparatus to extend and fill the space between opposing surfaces within the transport container and stabilize the cargo. A method for stabilizing cargo within a transport container includes providing an extensible load stabilizer having first and second tubular elements, each having a bearing member, positioning the load stabilizer between opposing surfaces within the transport container, and extending the tubular members with respect to each other, and stabilizing a surface of cargo against an opposing surface.

15 Claims, 13 Drawing Sheets

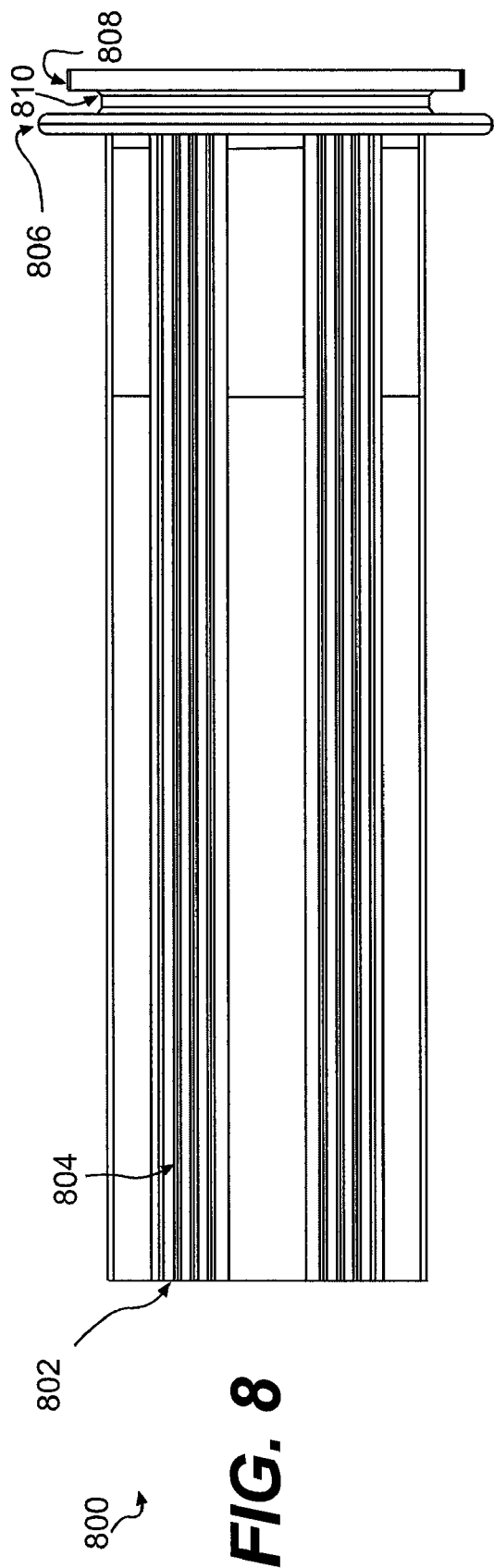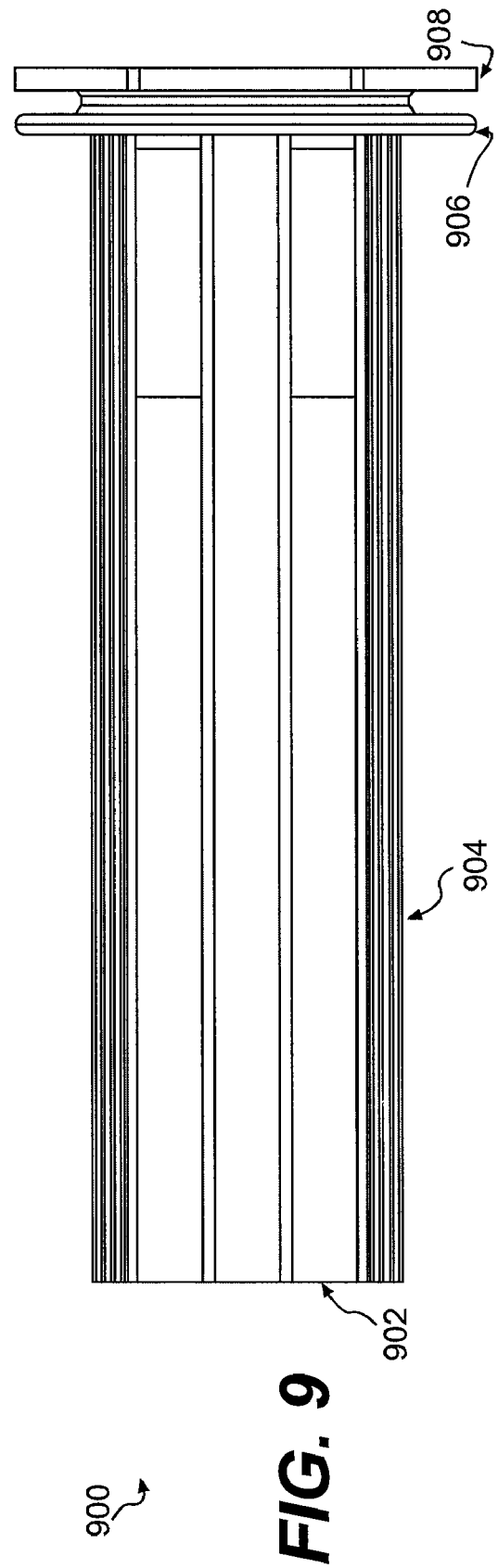

ADJUSTABLE LOAD STABILIZER METHOD AND APPARATUS

RELATED PATENTS

This application relates to U.S. Pat. No. 6,089,802 entitled "Cargo Restraint System for a Transport Container" issued on Jul. 18, 2000; U.S. Pat. No. 6,227,779 entitled "Cargo Restraint Method for a Transport Container" issued on May 8, 2001; U.S. Pat. No. 6,607,337 entitled "Cargo Restraint System" issued on Aug. 19, 2003; to U.S. Pat. No. 7,322,781 entitled "Adjustable Load Stabilizer Method and Apparatus" issued on Jan. 29, 2008 and to U.S. Pat. No. 7,604,443 entitled "Adjustable Load Stabilizer Apparatus Method and Apparatus" issued on Oct. 23, 2009 all of common inventorship and ownership with the subject application. The disclosure of application Ser. No. 11/127,193, now U.S. Pat. No. 7,322,281, and application Ser. No. 11/459,357, now U.S. Pat. No. 7,604,443, are hereby incorporated by reference as though set forth at length.

BACKGROUND OF THE INVENTION

This invention relates to an improved method and apparatus for stabilizing cargo during transportation. More particularly, this invention relates to a novel method and apparatus for stabilizing and restraining undesired movement of drums, boxes, rigid and flexible containers, palletized or not palletized, within the interior of a transport container or the like with respect to each other and/or with respect to the internal walls of the container.

Most shipments for transport are placed in enclosures such as ship cargo holds, intermodal containers, truck trailers, truck bodies, railroad box cars, and the like. Examples of cargo in containment enclosures include fifty five gallon closed head drums, super sacks or plastic reinforced bags, plastic wrapped bundles, cased goods, metal coils, specialty heavy paper rolls, plastic or metal containers mounted on pallets, etc. Although each individual component of cargo may be quite heavy and stationary at rest, the mass of a transport load can produce considerable momentum force as a ship, railroad car, truck trailer or truck body is placed in motion, stops, or changes direction.

During ocean shipping, cargo within cargo holds or intermodal containers are subjected to wave forces including: yaw, pitch, heave, sway, and surge. Depending upon weather conditions and the size of the vessel, cargo can experience various magnitudes of shifting forces throughout the course of a transoceanic voyage.

In another transport context, railroad trains are made-up by individual box cars being rolled together in a switching yard. When a railroad car is rolled into a stationary string of cars, the impact causes the car couplings to lock together with a jolt. This impact can apply a significant force to cargo within the rail car. Moreover, during transport, railroad cars and overland transport vehicles are subject to braking forces, bumps, centrifugal forces on curves, vibration, dips in the track or road, swaying, run-in or run-out forces, etc.

In overland truck/trailer transport there are frequent brake and acceleration forces imparted to the trailer and its contents, certrifical forces around curves, turning forces, uneven road surfaces, roadway transition junctions, roadway grades, etc.

Each of these forces has the potential to impart a substantial force to cargo during transport. When cargo contacts other cargo or the interior walls or doors of a container, the force necessary to reduce its momentum to zero must be absorbed by the goods and/or the container. Such forces can result in damage to the cargo, damage to the interior walls or doors of the container, damage to the cargo packaging, and may even create dangerous leaks if the cargo is a hazardous material. Accordingly, it is undesirable to permit cargo to gain any momentum independent of other cargo or a transport container. This can be accomplished by stabilizing the cargo within the container with respect to other cargo and/or the internal walls of the container so that the cargo and container are essentially united and operationally function as a single object during transport.

In order to stabilize cargo with respect to other cargo and the internal walls of a transport container or cargo hold, various forms of load containments, load spacers and void fillers have been used to fill the spaces between cargo and between cargo and the internal walls of an intermodal container, box car, cargo hold, truck trailer, etc. Often, load containment enclosures are secured to the floor or sides of the transport container and prevented from moving with respect to each other by specially fabricated wood or steel framing, floor blocking, rubber mats, steel strapping, or heavy air bags. A variety of dunnage materials and void fillers has been used to prevent the movement of cargo with respect to other cargo and the internal walls of the transport container. Each of these previously known systems has limitations associated with cost, lack of strength, amount of labor required for installation, time expended for installation, lack of flexibility, securement integrity, transportability and storage of spacer elements, etc.

Further to the above, in the past, various dunnage materials have been utilized within transport containers to eliminate unwanted movement or shifting of a load. Drums, boxes, or other containers have been restrained in several different ways. Primarily, cargo has been stabilized by the use of void fillers such as collapsible cardboard frames or cells. These systems use strips of corrugated cardboard configured and assembled to expand into solid rectangular frames or cells of various forms and sizes and incorporate honeycomb and/or diamond-shaped cells for space and strength considerations. These systems while useful for known rectangular voids can exhibit impaired performance due to size and/or dimension variance. Moreover curved surfaces can not be accommodated well with rectangular shaped void fillers. The difficulty in applying various rectangular units to irregular shapes and the on site adjustment for varying sizes of voids to be filled, the unsuitability of corrugated board to absorb strong compression forces, and the use of materials not fully resistant to moisture can impair use of this type of dunnage void filler system.

Other known means of restraint such as the use of inflatable dunnage bags used alone or in combination with collapsible void fillers have tended to exhibit the disadvantage that air bags are subject to rupturing, leakage and loss of air pressure, or simply contraction and securement loosening in low temperature environments.

In addition to the above, other restraining systems known in the past often required additional elements and equipment which tended to be cumbersome to store, arduous to handle and/or install, and often required a degree of skilled labor in application.

Finally, in certain instances wood block and bracing has been used in the past to fill voids and secure loads; however, wood bracing is somewhat time consuming to install and often requires skilled or semi-skilled labor which is often contracted out to third parties. In addition certain wood materials are not suitable for international transport without fumigation which increases the overall cost of the securement system.

Consequently, a need exists for securing cargo in cargo holds, transport containers, box cars, truck trailers and the like that is functionally effective, cost-efficient, and labor-efficient. Still further a need exists for load stabilization systems that have enhanced strength characteristics under a variety of environments, exhibit flexibility for loads of various types and sizes and limit cargo shifting within a container.

The problems suggested in the preceding are not intended to be exhaustive but rather are among many which may tend to reduce the effectiveness of load stabilizer methods and apparatus appearing in the past. Other noteworthy problems may also exist; however, those presented above should be sufficient to demonstrate that load stabilizing systems appearing in the past will admit to worthwhile improvement.

SUMMARY OF THE INVENTION

One embodiment of the invention comprises a method and apparatus for stabilizing cargo within a ship hold, transport container, box car, truck trailer, and the like with respect to other cargo and the internal walls of the container by the selective application of mutually extendible void filler cylinders. More specifically, stabilization is achieved by application of extension members, which are adjustable with respect to each other. Each extension member is coupled to a base which is designed to fit into an abutment or bearing member for direct or indirect positioning against a face of cargo or an internal wall of a transport container. Securement is achieved by extending the two extension members with respect to each other to fill in a void between the face of opposing cargo surfaces or an internal wall of a container and a cargo surface, or the like. A locking mechanism may be advantageously used to hold the two extension members in position.

THE DRAWINGS

Other aspects of the present invention will become apparent from the following detailed description of embodiments taken in conjunction with the accompanying drawings wherein:

FIG. 8 is a side view of one tubular member;

FIG. 9 is a rotated side view of a tubular member like the one shown in FIG. 8;

DETAILED DESCRIPTION

Context of the Invention

Figure 1:
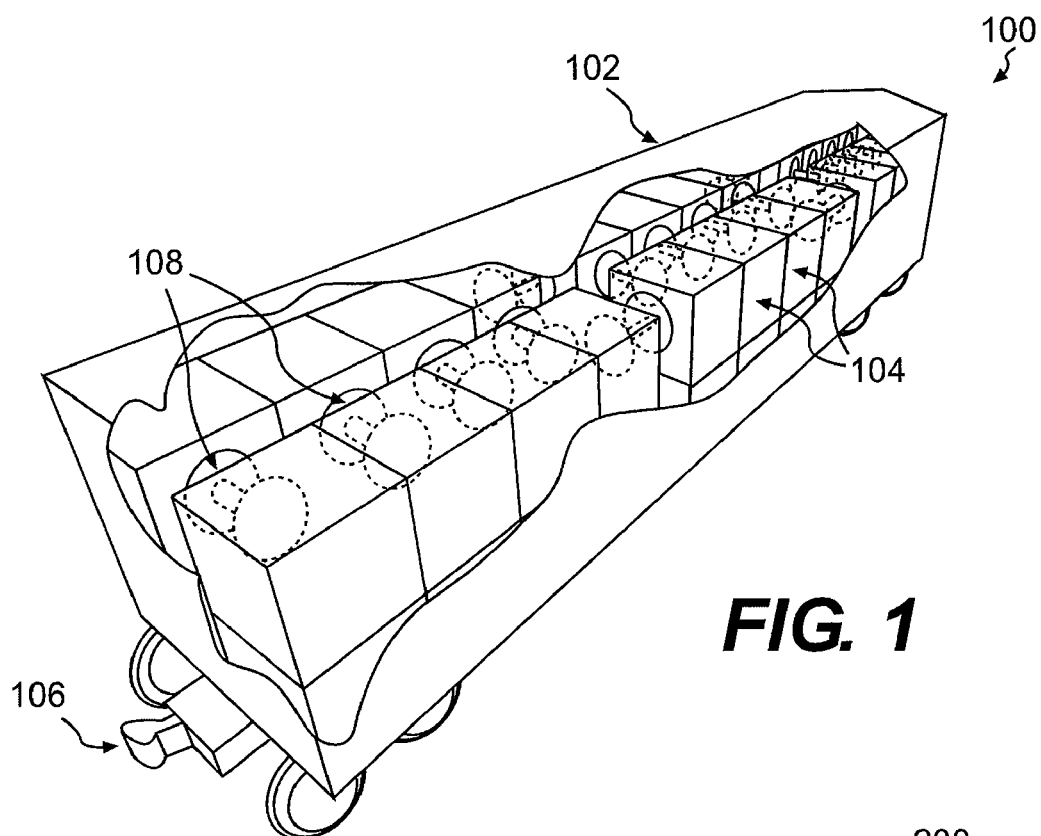
FIG. 1 is an axonometric view showing the interior of a railcar with cargo stabilized, both laterally and longitudinally, within the container in accordance with the subject invention.

Turning now to the drawing wherein like numerals indicate like parts, FIG. 1 shows an axonometric view of an operating environment 100 of the invention. In this, a railcar 102 is shown as a type of container that may be encountered. Railcars are used to transport a wide range of materials including many that must be protected from impact against the railcar walls as well as other cargo within the railcar. Cargo 104 must be protected from a variety of shifting forces during transit as noted above. One particular force encountered in railcars specifically is the impact force created when two railcars are "humped" or handled by a switching engine to in order to make up a train and secure a solid coupling connection as at 106. In addition run-in and run-out forces occasioned over grades can be substantial. The form of container 102 shown here is merely illustrative and the subject invention can be used to advantage in ship cargo holds, intermodal containers, and the like.

A partially cut away portion of FIG. 1 depicts various size and shapes of cargo 104, which are stabilized against each other and against the internal walls of the container 102 by load stabilizers 108 in accordance with the subject invention.

Figure 2:
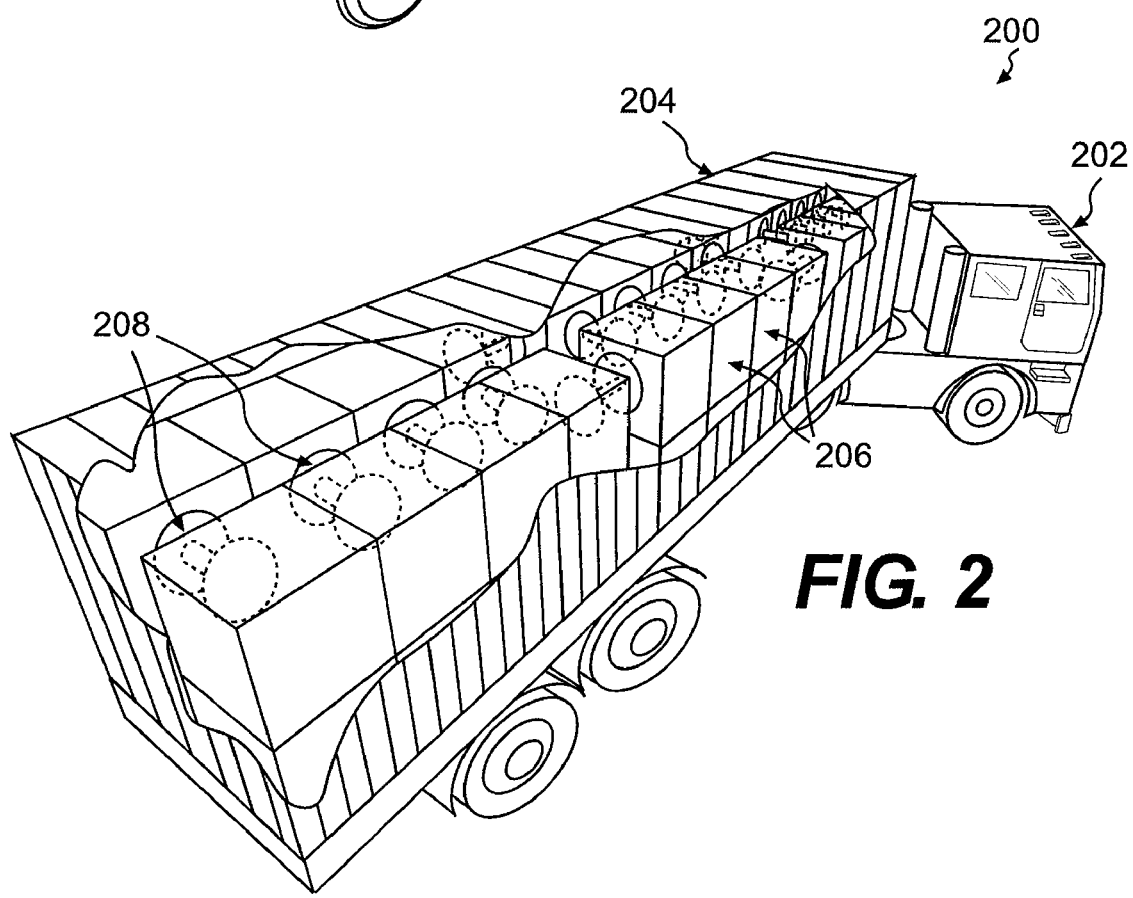
FIG. 2 is an axonometric view showing the interior of a transport container secured to a flatbed of a truck or truck trailer, with cargo stabilized within the container in accordance with the subject invention.

FIG. 2 shows another operational context 200 of the invention. In this context, container 204 is secured to a trailer towed by tractor 202. Cargo 206 is subject to a wide range of overland road forces that must be protected against. The braces 208, in accordance with the subject invention, serve to provide both lateral and longitudinal securement of the cargo from impact with other cargo and with the walls of the container 204.

Void Filler and Load Stabilizer

Figure 3:
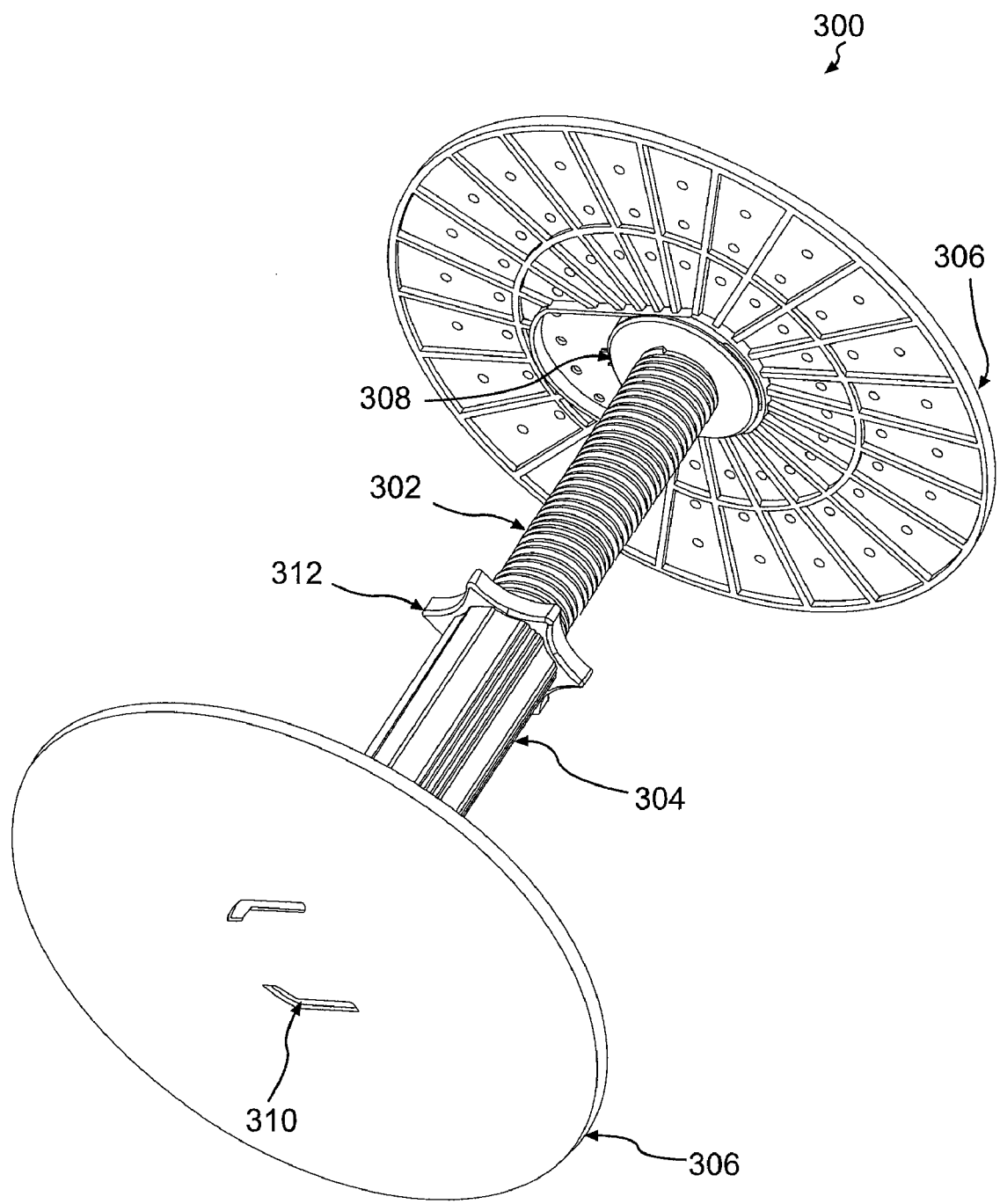
FIG. 3 is a perspective view of one embodiment of the present invention showing a first tubular member, a second tubular member, and two bearing elements.

FIG. 3 is a perspective view of one embodiment of the subject void filler invention 300. In this tubular member 302 is a male member inserted into female tubular member 304. Member 302 is externally threaded to match the internal threads of member 304. Due to this threading, member 302 can be extended or retracted longitudinally by turning either or both of members 302 and 304. In one embodiment, the tubular members 302 and 304 are double threaded and two rows of threads start in diametrically opposing positions. In another embodiment three threads can be started at the same time. Depending on the pitch of the threads and the coefficient of friction of the material and weight of the unit, the two members may be advantageously self separating by gravity. This means that the device 300 is turned on its end and the members 302 and 304 are cause to spin relative to one another, the bottommost member will continue to turn until disengaged with the topmost member without extra input of energy to maintain the spin.

Bearing members 306 comprise the surfaces that will directly or indirectly abut against or contact cargo or the walls of a transport container. These bearing members are selectively removable in one embodiment and are connected at point 308 to members 302 and 304 (connection point on member 304 not shown). The bearing member 306 is released from the tubular member 302 by sliding it out of securing slots that are detailed below. However, this is not the only attachment mechanism that may be used. The bearing members may be permanently affixed to members 302 and 304 by injection molding the entire void filler 300. They also may be screwed or bolted into position or turned into position and locked with a ratchet type mechanism. Any securing method that reliably attaches the tubular member to the bearing member is appropriate. The outside of bearing member 306 shows contours 310 cut into the bearing member. These contours are present due to the injection molding process, they allow the bearing member to be broken from the form after cooling. Once extended, void filler 309 holds it position by being locked with locknut 312. Locknut 312 is moved into position with a tool or by hand and secured against the female tubular member 304 to prevent further rotation and disengagement with cargo in a transport container.

When the detachable embodiment is used, then this invention provides the additional benefit of being easy to ship to its destination. For example, drop-down type cardboard void fillers can be shipped at approximately 100 pieces per pallet. The subject invention can be shipped at between 900 and 1000 pieces per pallet. This is due to its configuration and the ability to stack the bearing member elements and closely pack the tubular members.

Figure 4:
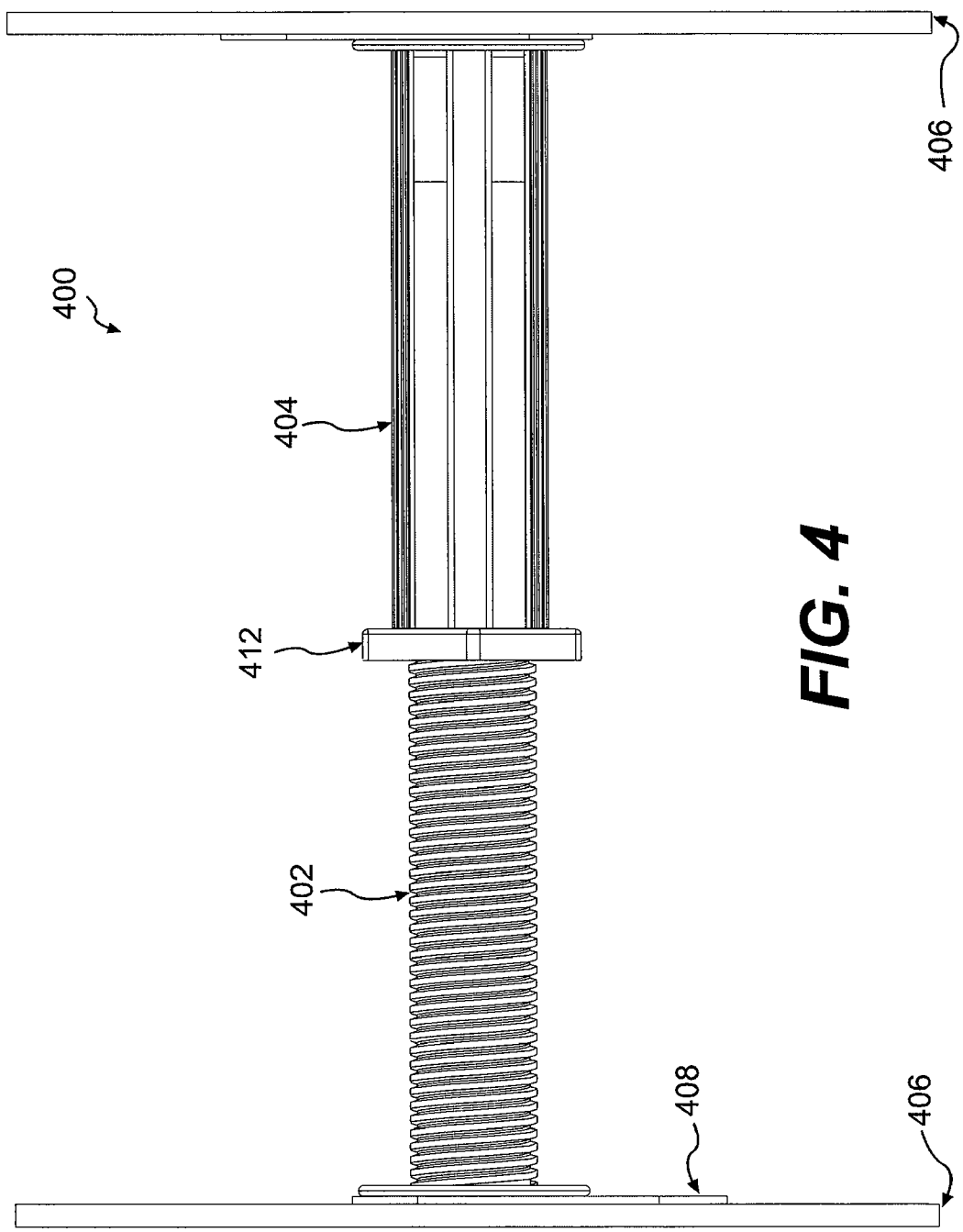
FIG. 4 is a side view of the embodiment of the invention depicted in FIG. 3.

FIG. 4 is a side view of the void filler 400 of the subject invention. Tubular member 402 inserts into tubular member 404 and is selectively telescoped by turning the two members relative to one another. Bearing member 406 comes into contact with cargo and with the walls of a transport container to prevent damage of contents during shipping. Tubular member 402 attaches to base 408 by sliding into a slot at point 408. Please note that as above, any type of connection mechanism could be used here including permanent attachment. As illustrated in FIG. 4, and confirmed in FIGS. 8, 9 and 13, the longitudinal length of each of the male tubular member 402 and the female tubular member 404 has a length dimension that is less than the diameter of the bearing members 406 and the subject void filler unit 300 is relatively compact to fill spacing between opposing surfaces of cargo within a container or between a cargo container side wall surface and cargo within the container. Locknut 412 is used to secure the two tubular members at a particular extension. When the proper size of the void filler 400 is reached, locknut 412 is turned into place and tightened either by hand or using a tool and prevents further movement of the tubular members with respect to one another. Note that this nut may be any configuration to fit any type of tightening tool or to more easily be tightened by hand.

Figure 5:
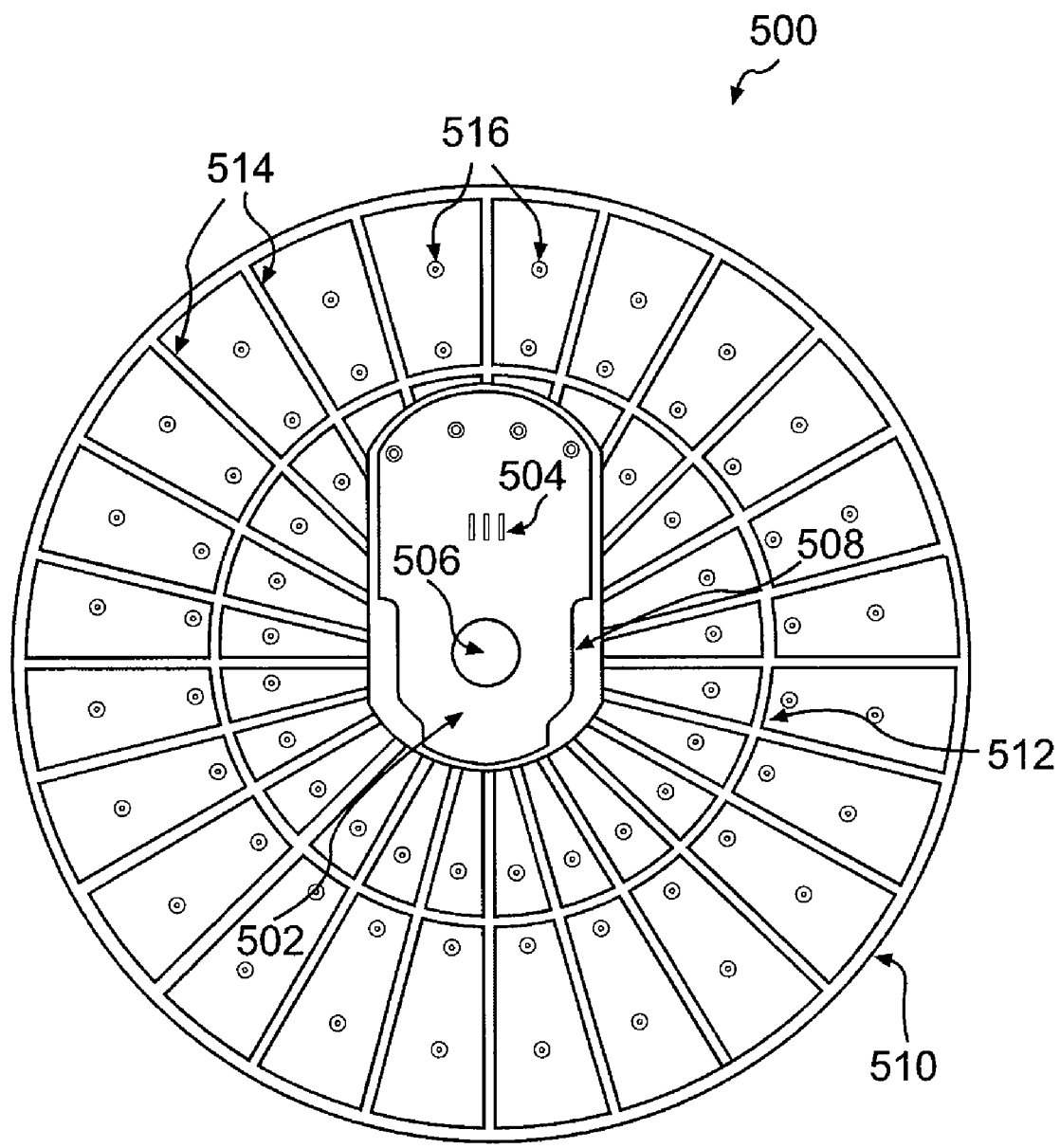
FIG. 5 is a view of one side of the base that is attached to one of the two tubular members.

FIG. 5 is a detailed schematic of the apparatus bearing member 500 with the side shown facing in toward the tubular members from FIG. 4. Tubular members, such as 402 and 404, attach to the bearing member 590 in position 502. The tubular member is placed over ramp 504, then it can be slid down into position 502 by ensuring that the edge of the tubular member, to be detailed below, fits under slot 508 on each side. Once in position, ramp 504 ensures that the tubular member will not inadvertently slide out of its attachment with the bearing member. Dimple 506 is slightly raised and gives additional security to the attachment of the tubular member.

For added strength, the bearing member 500 is reinforced. Reinforcement rings 510 and 512 provide circumferential reinforcement by being placed around the outside of the bearing member as well as in a position between the outside of the bearing member and the center of the bearing member, as 512. There is no limit to the number of rings that may be used, the more rings, the greater the ability of the bearing member to withstand outside stresses. Additionally, reinforcement elements 514 provide radial reinforcement. Again, there can be any number of reinforcement elements depending on the desired strength. Elements 510, 512 and 514 are made of the same material as the remainder of the bearing member but are thicker and provide greater support. Nail holes 516 allow the bearing member to be secured to any surface into which nails can be driven. These may be actual holes, or they may be portions of the bearing member that are thin with respect to the rest of the bearing member and allow nails to be easily driven through.

The subject invention may be constructed of a wide range of materials. In one embodiment, the tubular members are molded from a high density polyethylene and the bearing members are constructed of acrylonitrile butadiene styrene (ABS.) The subject invention can be constructed of any one, or any combination of the following materials: polyvinyl chloride (PVC), ABS, polyethylene, and polystyrene. This lists is not meant to be exhaustive, any material that provides the requisite strength and reliability for protecting cargo may be used to advantage.

Figure 6:
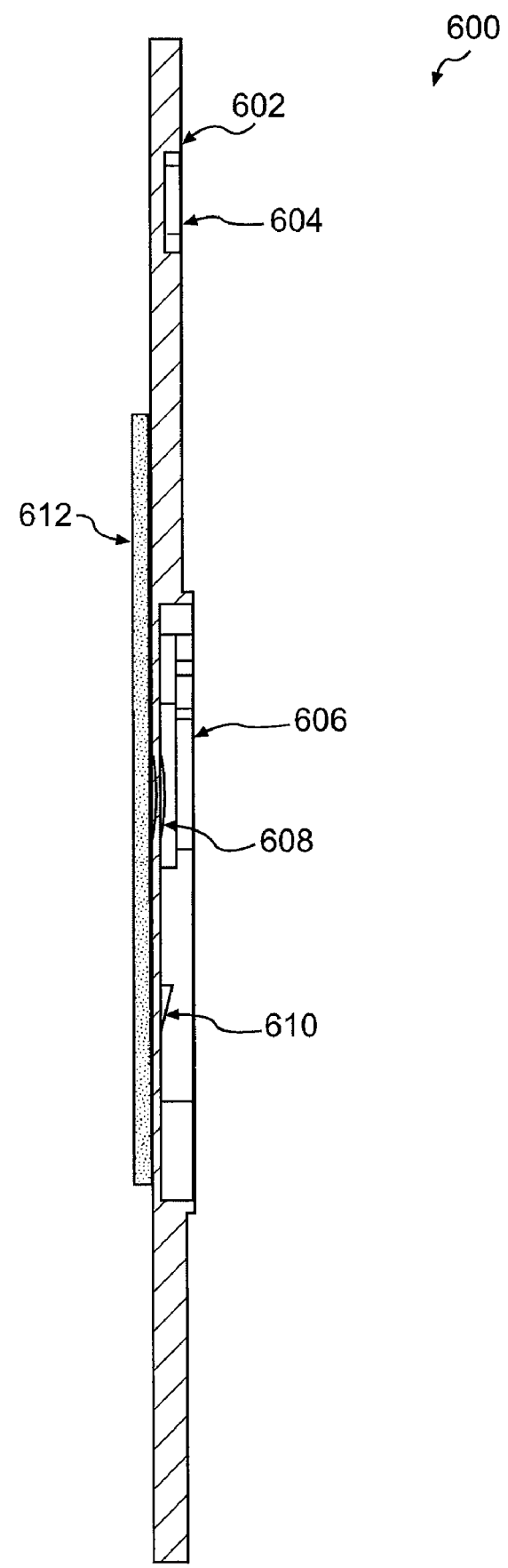
FIG. 6 is side view of a base like the one shown in FIG. 5.

FIG. 6 shows a side view of a bearing member 600 such as the one shown in FIG. 5. Tubular members such as 402 and 404 fit in slot 606 and are held in place by ramp 610. Dimple 608 also helps to hold the tubular member securely in place. They are released by slightly bending the bearing member to slide the tubular member over ramp 610. Nail hole 604 is shown extending only partially through bearing member 600. A nail can be driven through this and into a surface. Optional adhesive element 612 allows the bearing member to be adhered to a container wall or opposing cargo so it can be easily extended into place by one person. Typically, this adhesive will be on a bearing member attached to a male tubular member so the female member is free to turn into position.

Figure 7:
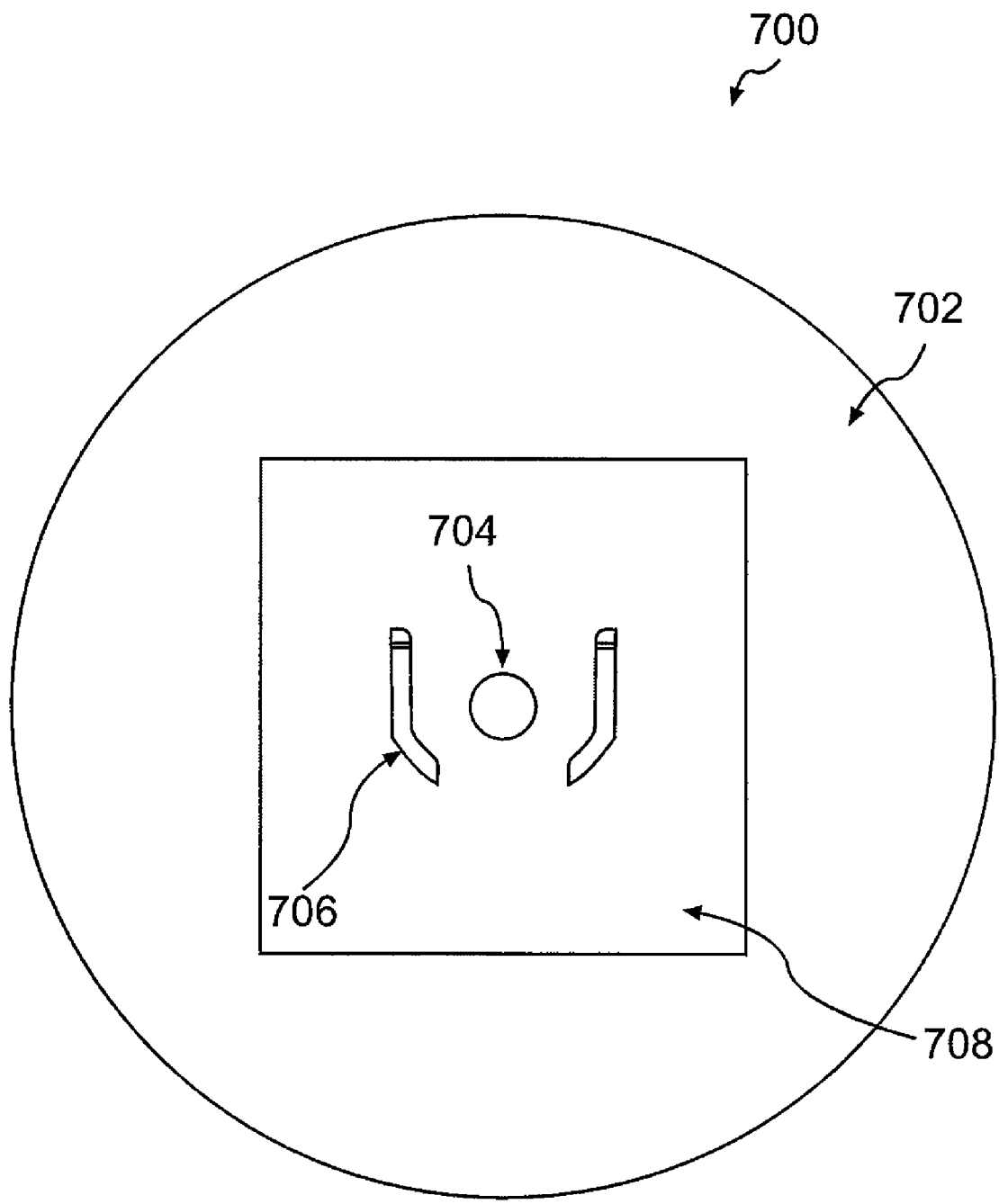
FIG. 7 is a view of an opposite side of a base like the one shown in FIG. 5.

FIG. 7 shows an opposite side of a bearing member 700 such as the one shown in FIG. 6. Surface 702 is smooth and contacts either the container wall or a surface of cargo in the container. Dimple 704 and holes 706 are products of the injection molding process and are not required for the function of the void filler although dimple 704 does provide extra security for the inserted tubular member on the opposite side as described above. The primary requirement for this surface is that is not have protrusions extending out that would damage the cargo. However, in another embodiment, the user may require a mechanical connection with the cargo and damage is not an issue, in this case, protrusion off the bearing member could be used to secure the bearing member to the surface. Optional adhesive element 708 allows the bearing member to be removeably affixed to either a cargo surface or a container wall.

FIGS. 8 and 9 show two side views of a female tubular member such as element 404. In FIG. 8, a male tubular member is inserted at point 802 and extends and retracts from that point. Contours 804 allow the female member 800 to be turned and tightened into position. Lip 808 is slid into place under the slots of the bearing member such as those shown as element 508 in FIG. 5. These slots fit into space 810 and hold the member 800 in position. Optional lip 806 rests above the bearing member slots and provides additional security to the attachment. In FIG. 9, a male tubular member is inserted at point 902 and extends and retracts from that point. Contours 904 allow the female member 900 to be turned and tightened into position. Lip 908 fits into the rounded portion of space 502 in FIG. 5. It may alternatively rest next to ramp 504 thus holding the tubular member in place. The shape of lip 908 allows it to be inserted in a bearing member and prevents any turning that may result from a circular type arrangement. Optional lip 906 rests above the bearing member slots and provides additional security to the attachment.

Figure 10:
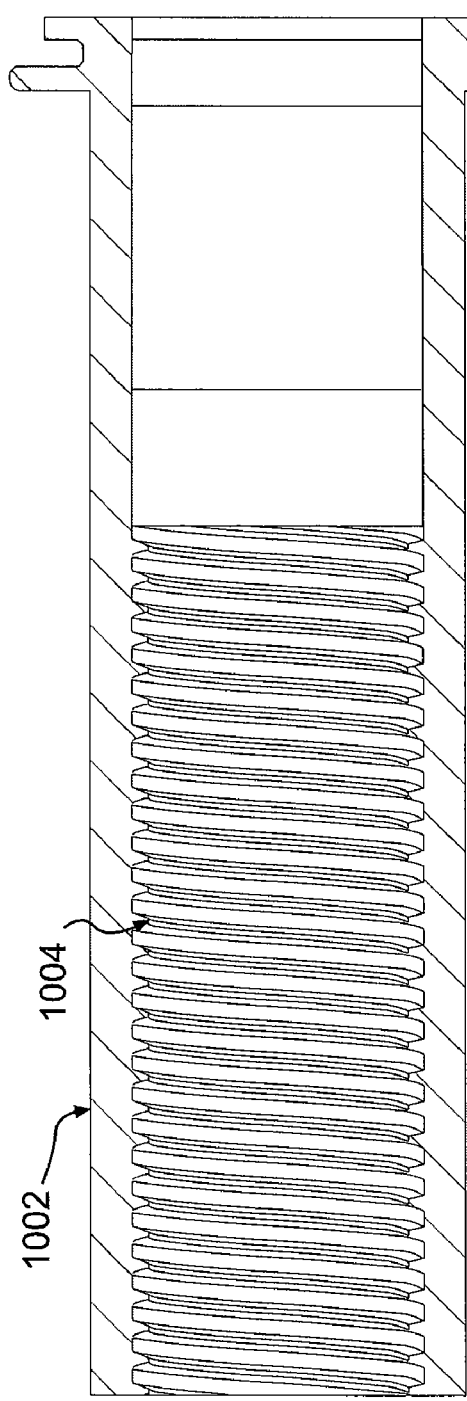
FIG. 10 is side cross-sectional view of a tubular member used in one embodiment of the present invention.

FIG. 10 is a cross sectional view of a female tubular member 1000 such as the ones shown in FIGS. 8 and 9. Outer surface 1002 may have contours to assist in hand tightening when extending the tubular members with respect to one another. Threads 1004 are designed to correspond to threads on a male tubular member and in one embodiment, are set at a pitch to make the device self driving when an initial turning force is applied. As shown above, slots on the bearing member fit in at space 1006 to hold the tubular member in place.

Figure 12:
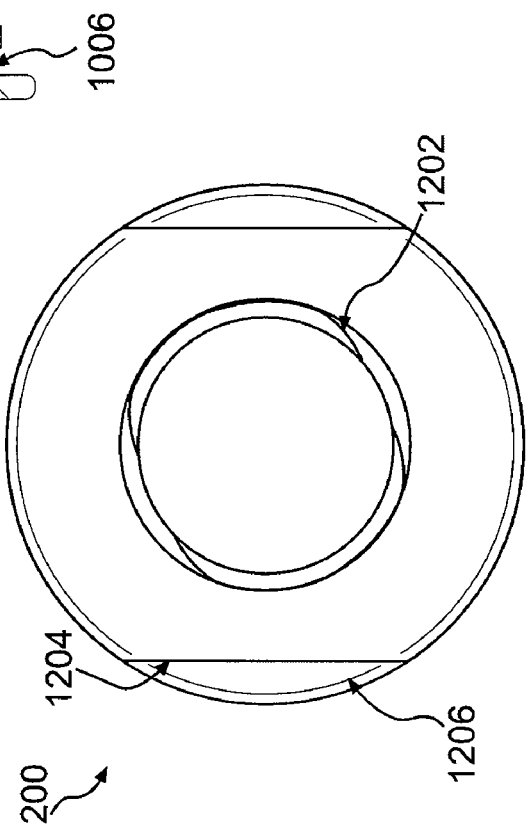
FIG. 12 is an opposite end view of a tubular member used in one embodiment of the invention.
Figure 11:
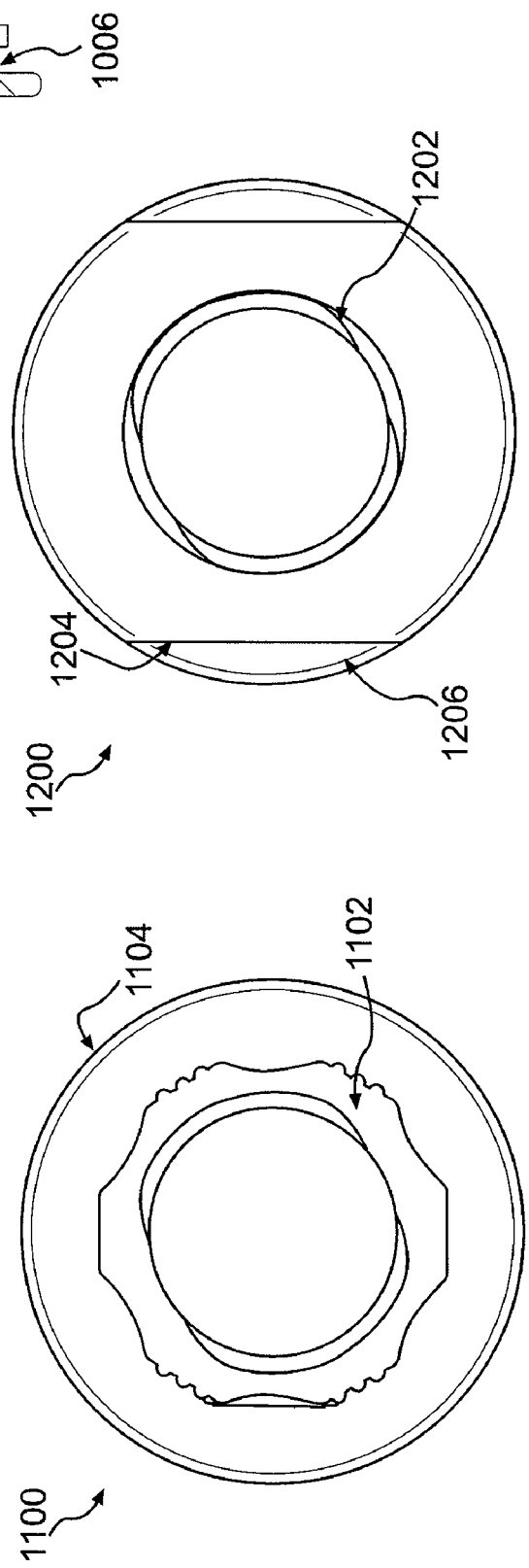
FIG. 11 is an end view of a tubular member used in one embodiment of the invention.

FIG. 11 is an end view of a female tubular member 1100 such as the ones shown in FIGS. 8 and 9. In one embodiment, the tubular member is double threaded as shown at point 1102. Lip 1104 rests above the slots in the bearing member as described above. FIG. 12 is a view from the opposite end of a female tubular member such as the one shown in FIGS. 8 and 9. In one embodiment, this is double threaded as shown at point 1202. Lip 1204 fits into a bearing member such as the one shown in FIG. 5. The flat sides of this lip 1204 correspond to the flat sides in area 502. This configuration causes the tubular member to fit in place and prevents any turning of the tubular member with respect to the bearing member. Lip 1206 is circular and adds stability to the void filler by resting on top of slots 508 of a bearing member.

Figure 13:
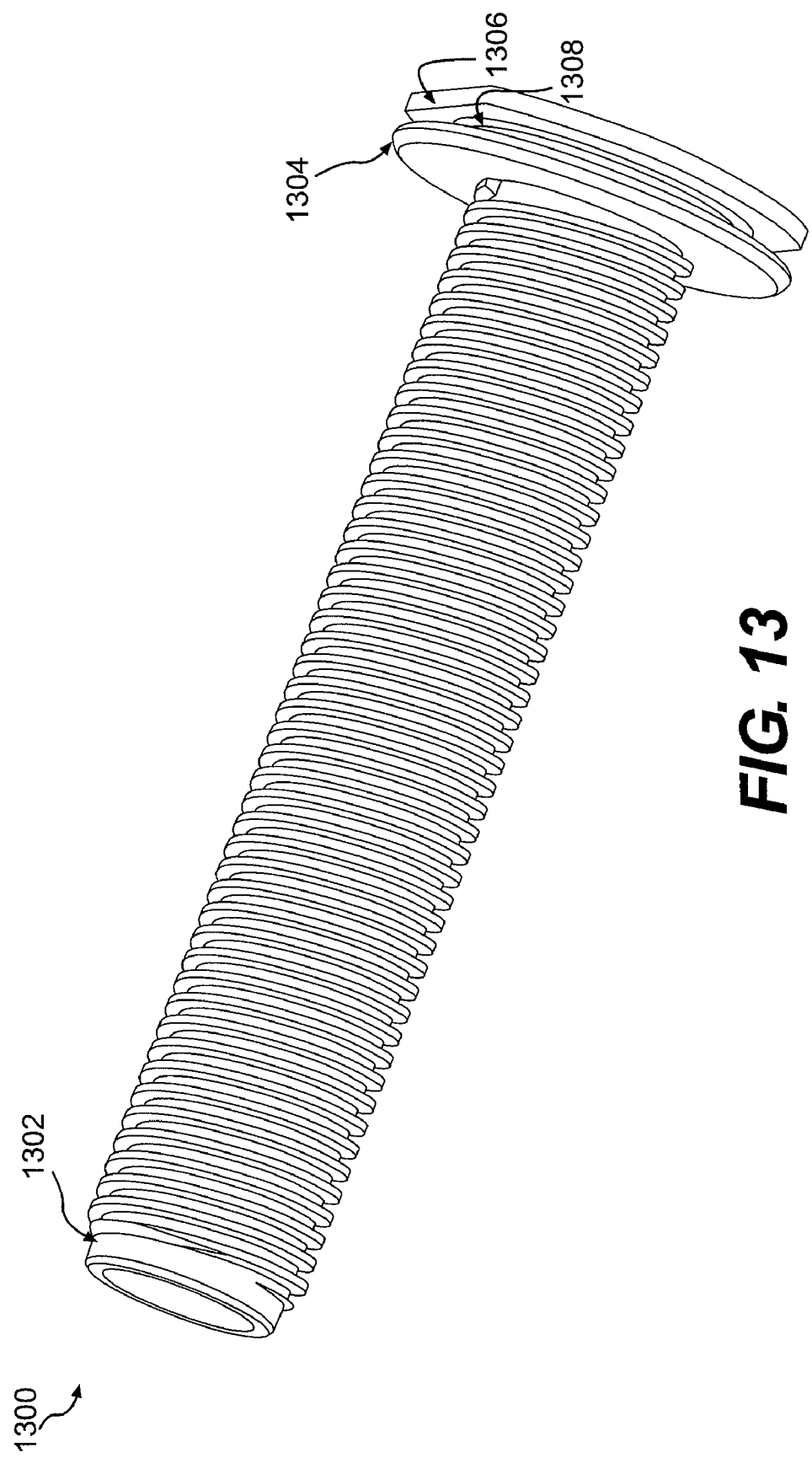
FIG. 13 is a perspective view of a tubular member used in one embodiment of the invention.

FIG. 13 is a perspective view of a male tubular member 1300 such as element 402 of FIG. 4. Threads 1302 extend along the body of the tubular member and correspond to threads in a female tubular member such as element 404. In one embodiment, both tubular members are double threaded. In another embodiment, these threads are set at a pitch that allows the tubular members to be self driving when the void filler is assembled and a turning force is applied. Lip 1306 slides into place on a bearing member as described above in the description of the male member. The slots of the bearing member fit in space 1308 and lip 1304 rests on top of the bearing member slots for additional stability.

Figure 14:
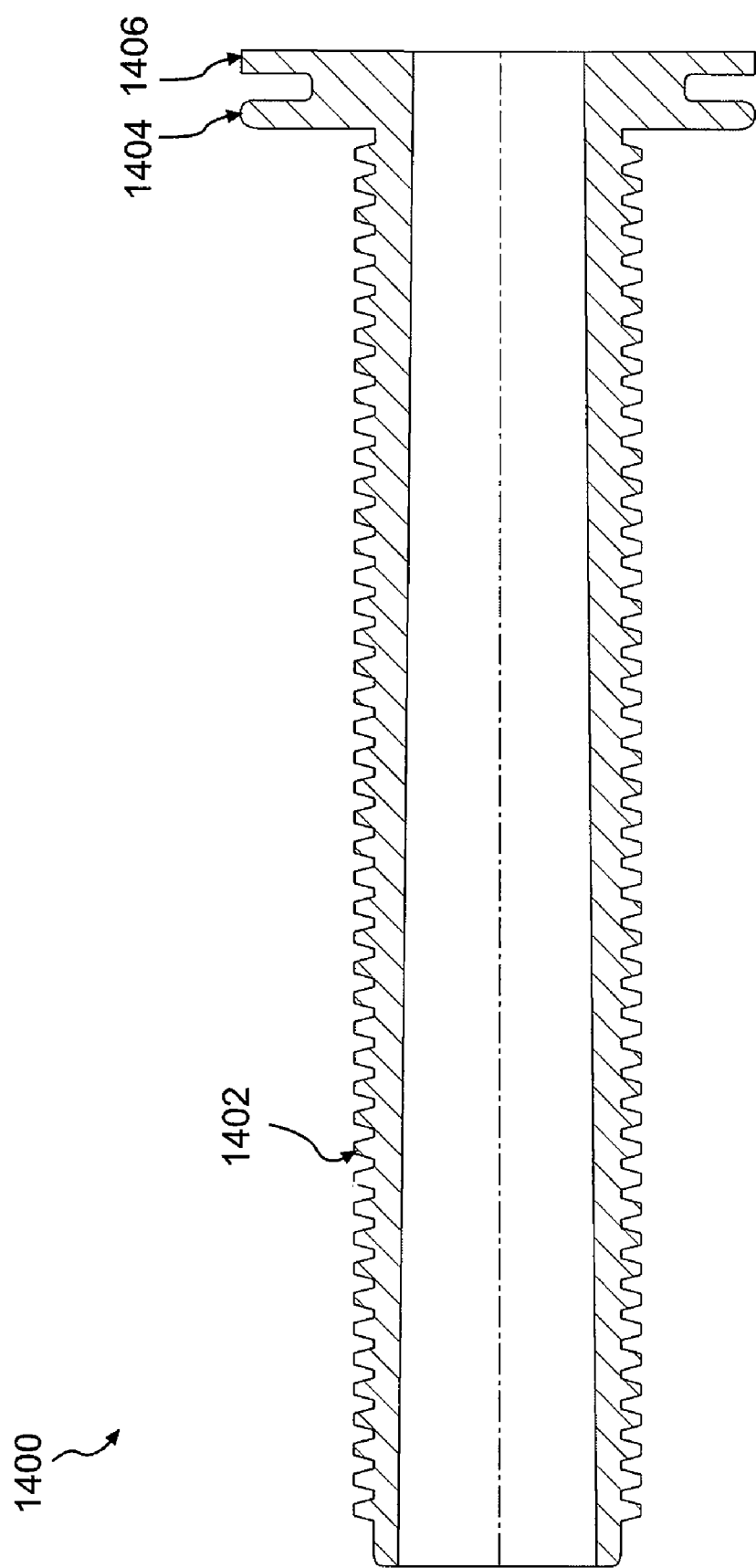
FIG. 14 is a cross-sectional view of a tubular member like the one shown in FIG. 13.

FIG. 14 shows a cross-sectional view of a male tubular member 1400 such as the one designated as element 402 in FIG. 4. Threads 1402 correspond to the internal threads of a female tubular member. Lip 1406 fits into slots on a bearing member as described above and lip 1404 rests on the slots on a bearing member for stability as described above.

Figure 15:
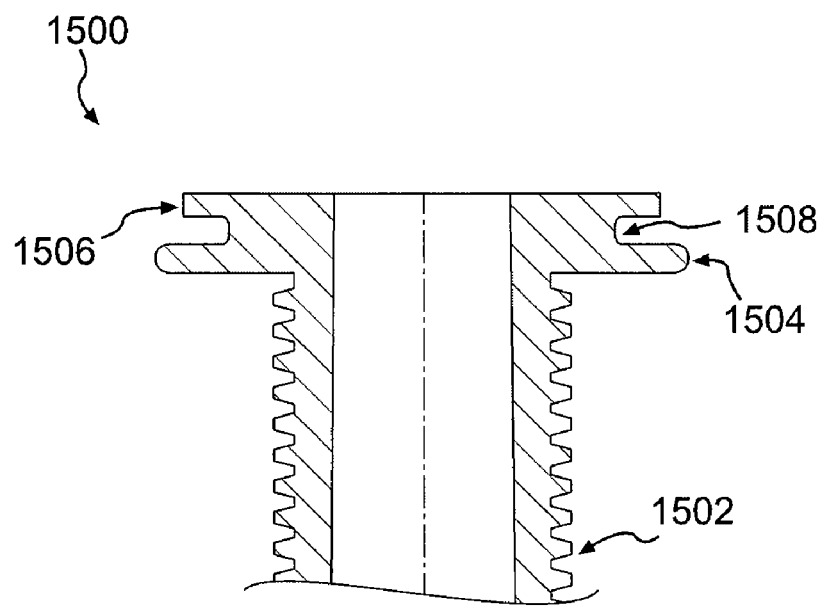
FIG. 15 is a rotated cross-sectional view of a tubular member like the one shown in FIG. 14.

FIG. 15 shows a view of the same member shown in FIG. 14 but turned 90°. This view of a male tubular member 1500 shows threads 1502 as well as lips 1504 and 1506. The slots on the bearing member fit into spaces 1508. This view shows that the lip 1506 has flat sides to allow for fitting into the bearing member as described above.

Figure 16:
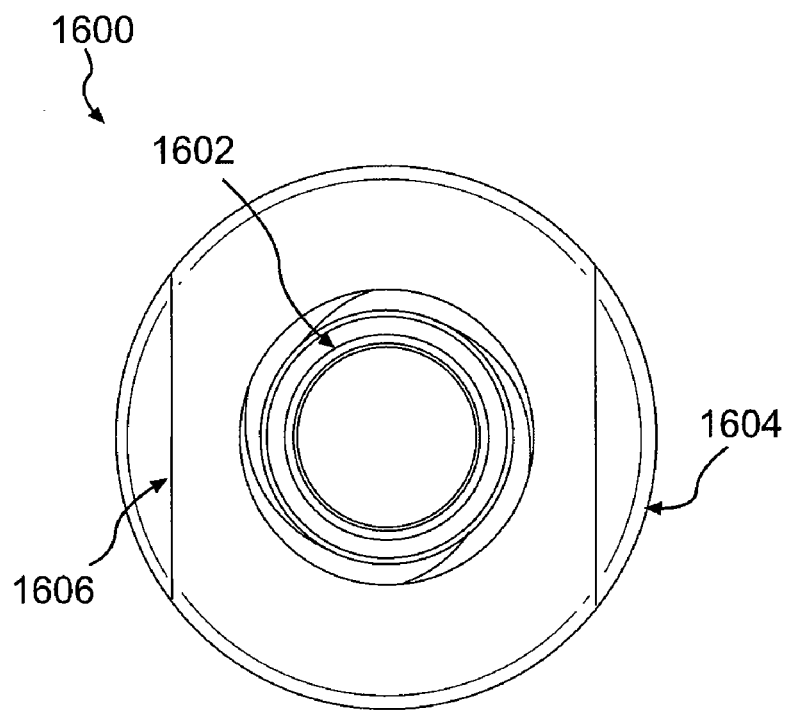
FIG. 16 is an end view of a tubular member used in one embodiment of the invention.

FIG. 16 shows a top view of male tubular member 1600. This corresponds to the top view of female tubular member 1200 in FIG. 12. Threads 1602 fit into a female tubular member and lips 1604 and 1606 fit into a bearing member as described above.

Figure 17:
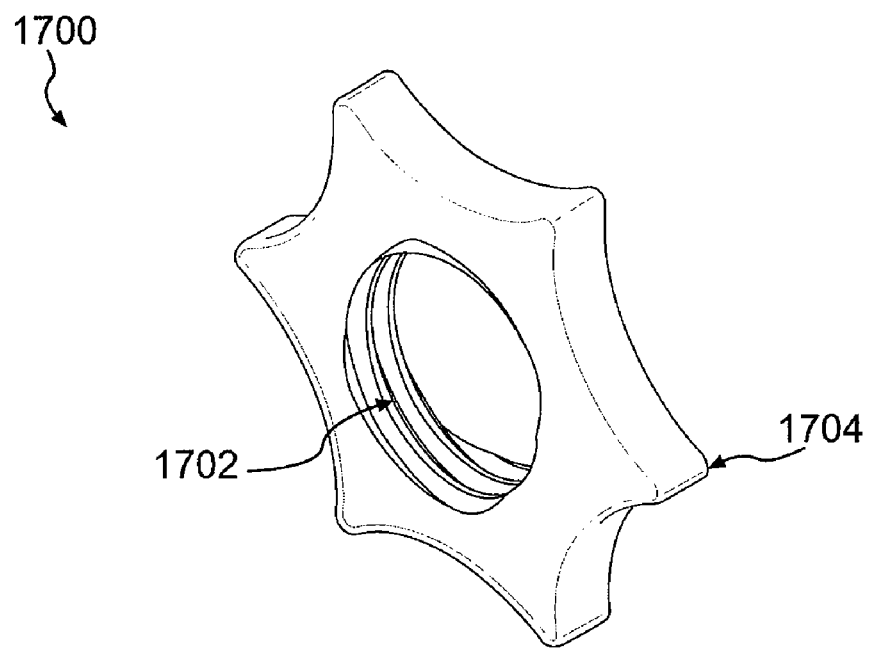
FIG. 17 is a perspective view of a locknut used in one embodiment of the invention.

FIG. 17 is a perspective view of a locknut 1700 such as the one labeled 412 in FIG. 4. Threads 1702 correspond to the threads of a male tubular member, such as element 402. Contours 1704 allow the locknut to turned into place by hand and may take a variety of forms. The locknut may also be shaped to correspond to a turning tool and tightened into place with that tool.

Figure 18:
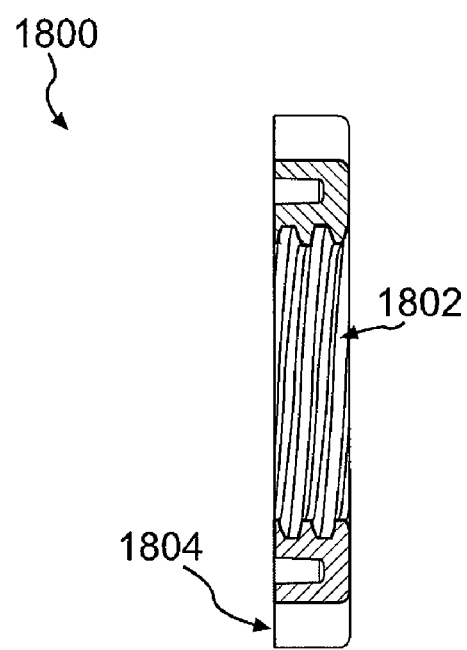
FIG. 18 is a cross-sectional side view of a locknut used in one embodiment of the invention.

FIG. 18 is a cross sectional side view of the same locknut, labeled 1800. Threads 1802 and contours 1804 correspond to those described above regarding FIG. 17.

Figure 19:
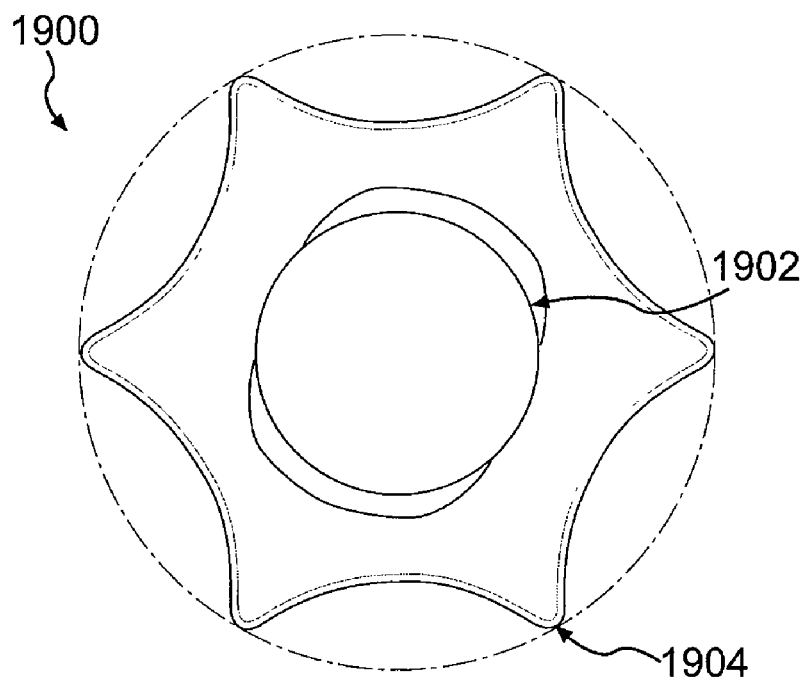
FIG. 19 is a front view of the locknut shown in FIG. 17.

FIG. 19 is another view of a locknut 1900 such as the one illustrated in FIGS. 17 and 18. Threads 1902 and contours 1904 correspond to those described above regarding FIG. 17.

Figure 20:
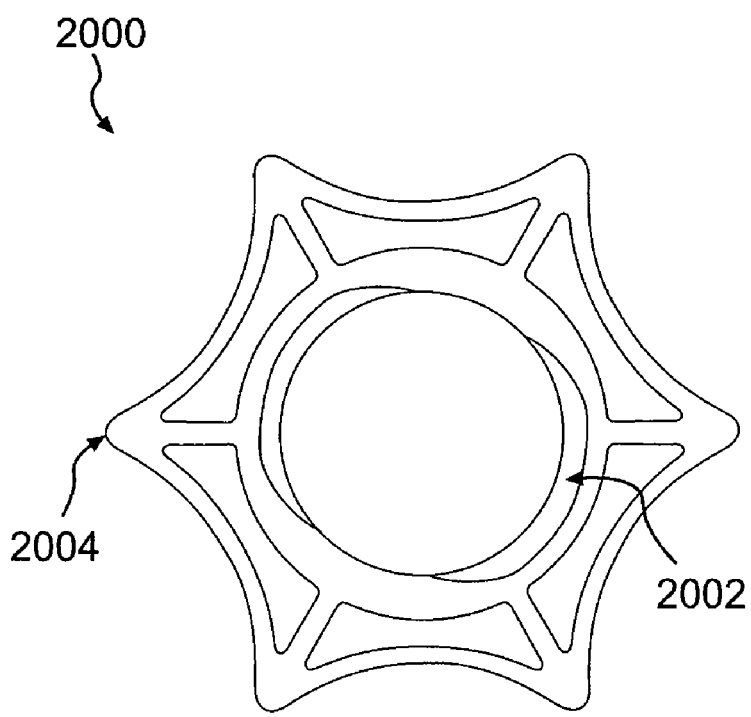
FIG. 20 is a back view of the locknut shown in FIG. 17.

FIG. 20 is a cross sectional view of a locknut 2000 such as the one shown in previous figures. Threads 2002 and contours 2004 correspond to those described above regarding FIG. 17. Note reinforcing spines radiating out to provide additional stability and strength for the locknut 2000.

A method is detailed in which to use the use the subject invention. There is no particular order implied in the steps of the method and they can be performed in any suitable order. In one embodiment, the base member attached to a male tubular member is placed flush with a piece of cargo or another surface in the transport container. While this is held in place, the female tubular member with attached base is turned in relation to the male tubular member. This extends the female tubular member toward another surface or cargo in the transport container. The female tubular member is turned until the second base member is in contact with the opposing surface and tightened sufficiently. A locknut on the male member is then turned into position to secure the void filler at the desired length.

This method is not exhaustive and can be practiced on any of the embodiment described above. The void filler will be extended using the selected extension mechanism and held in place.

The preceding description has been presented only to illustrate and describe the invention and some examples of its implementation. It is not intended to be exhaustive or to limit the invention to any precise form disclosed. Many modifications and variations are possible and would be envisioned by one of ordinary skill in the art in light of the above teaching.

The various aspects were chosen and described in order to best explain principles of the invention and its practical applications. The preceding description is intended to enable others skilled in the art to best utilize the invention in various embodiments and aspects and with various modifications as are suited to the particular use contemplated. It is intended that the scope of the invention be defined by the following claims; however, it is not intended that any order be presumed by the sequence of steps recited in the method claims unless a specific order is directly recited.

What is claimed is:

1. An apparatus for stabilizing cargo within a transport container, said apparatus comprising:
    a first tubular member having
        a body having a first end and a second end, and
        a first bearing member connected to said first end of said body of said first tubular member,
            said first bearing member of said first tubular member being operable to react against a surface of at least one of an internal wall within said transport container and cargo to be stabilized within said transport container;
            said first bearing member of said first tubular member being selectively removable from said first tubular member;
        said first tubular member being a female tubular member with internal threads;
    a second tubular member having
        a body having a first end and a second end, and a second bearing member connected to said first end of said body of said second tubular member;

said second bearing member being operable to react against a surface opposite to said surface of at least one of an internal wall within said transport container and cargo to be stabilized within said transport container;

said second bearing member of said second tubular member being selectively removable from said second tubular member;

said second tubular member is a male tubular member with external threads;

the second end of said second tubular member being configured to engage and selectively translate with respect to the second end of said first tubular member;

said second tubular member operably extends with respect to said first tubular member when said first tubular member is rotated with respect to said second tubular member; and a locknut being configured to fit on and translate along said male tubular member and contact said female tubular member holding the apparatus for stabilizing cargo at a desired length;

wherein said apparatus for stabilizing cargo is operable to be placed between a surface of cargo to be stabilized and at least one of an opposing surface of other cargo to be stabilized within said transport container and an internal wall surface of said transport container thus stabilizing cargo within the container by extending and filling space between opposing surfaces within said transport container.

2. The apparatus for stabilizing cargo within a transport container as defined in claim 1, wherein:
said first bearing member and said second bearing member are circular in shape.

3. The apparatus for stabilizing cargo within a transport container as defined in claim 1, wherein:
one of said first bearing member and said second bearing member further comprises an adhesive area being configured to secure said one hearing member to a surface within the transport container.

4. The apparatus for stabilizing cargo within a transport container as defined in claim 1, further comprising:
a slot positioned on said first bearing member and said second bearing member; and
said first tubular member and said second tubular member being configured to engage said slot and slide into a secure position.

5. The apparatus for stabilizing cargo within a transport container as defined in claim 1, wherein:
at least one of said first or second tubular members further comprises an exterior surface operable for receiving rotational force applied to the exterior surface of said at least one of said tubular members.

6. The apparatus for stabilizing cargo within a transport container as defined in claim 5, wherein:
said exterior surface comprises an area molded to fit a tightening tool.

7. The apparatus for stabilizing cargo within a transport container as defined in claim 5, wherein:
said exterior surface comprises a plurality of longitudinally extending raised spines or ribs.

8. The apparatus for stabilizing cargo within a transport container as defined in claim 1, wherein:
one of said first bearing member and said second bearing member further comprises reinforcement elements configured to provide circumferential reinforcement.

9. The apparatus for stabilizing cargo within a transport container as defined in claim 1, wherein:
one of said first bearing member and said second bearing member further comprises reinforcement elements configured to provide radial reinforcement.

10. The apparatus for stabilizing cargo within a transport container as defined in claim 1, wherein:
one of said first bearing member and said second bearing member further comprises nail holes configured to allow said one bearing member to be secured to a surface within said transport container.

11. The apparatus for stabilizing cargo within a transport container as defined in claim 1, further comprising:
a ramp positioned on said first bearing member and said second bearing member configured to ensure said first tubular member and said second tubular member will not inadvertently slide out of abutment with said first bearing member and said second bearing member.

12. The apparatus for stabilizing cargo within a transport container as defined in claim 1, wherein:
said locknut comprises contours operable for receiving rotational force; and
said locknut comprises internal threads operable to correspond to the threads of said second tubular member.

13. The apparatus for stabilizing cargo within a transport container as defined in claim 12, wherein:
said locknut comprises reinforcing spines to provide additional stability and strength to said locknut.

14. The apparatus for stabilizing cargo within a transport container as defined in claim 4, wherein:
said first tubular member and said second tubular member comprises a first lip and second lip being configured to engage said slot and slide into a secure position.

15. The apparatus for stabilizing cargo within a transport container as defined in claim 1, wherein:
said internal threads and said external threads and configured to self-rotate by gravity.

* * * * *